Aug. 8, 1944.  R. A. LITSCHERT  2,355,384
TELESCOPIC SIGHT
Filed Sept. 1, 1943
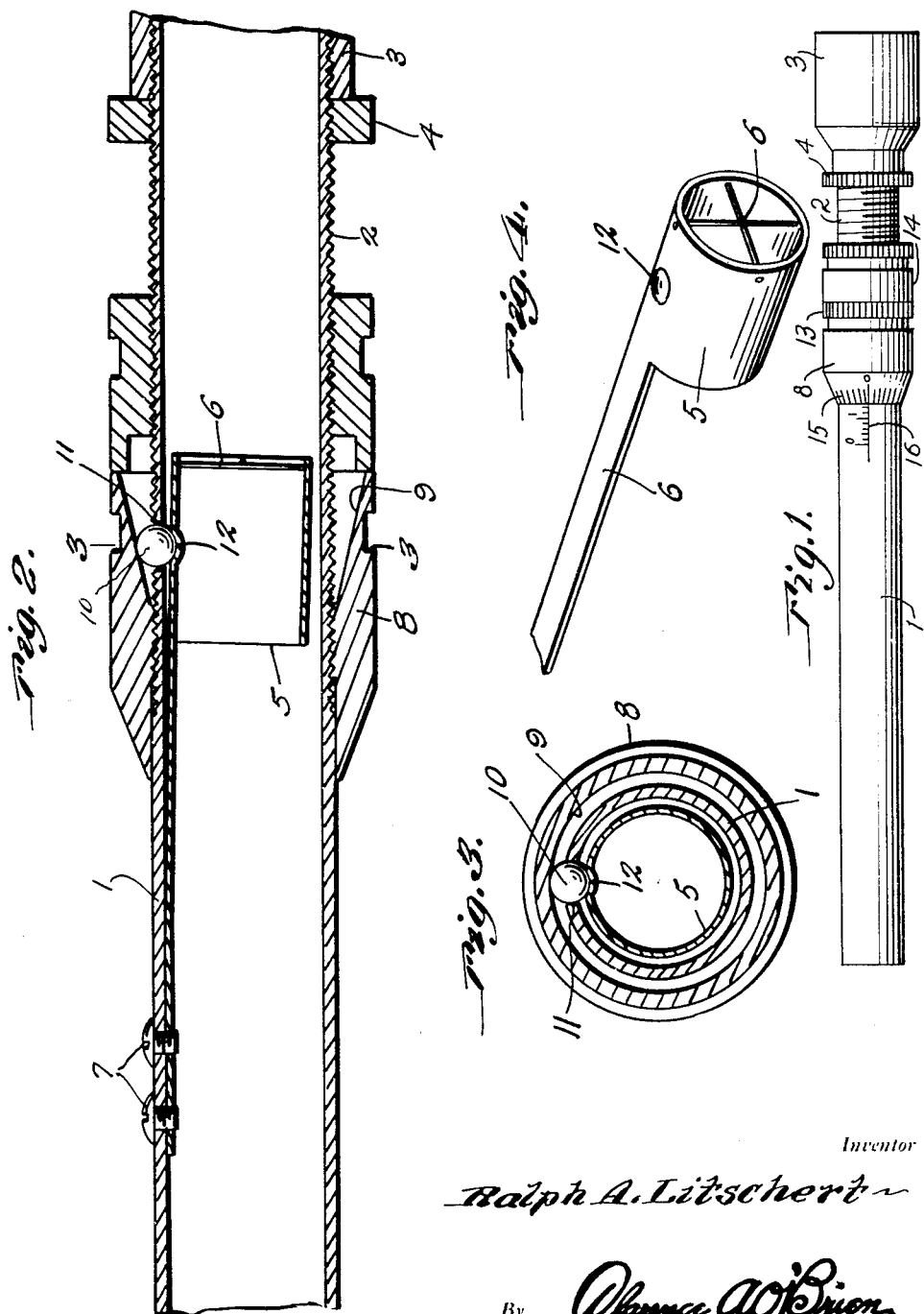
Inventor
Ralph A. Litschert
By Clarence A. O'Brien
and Harvey B. Jackson
Attorneys Patented Aug. 8, 1944

2,355,384

UNITED STATES PATENT OFFICE 2,355,384

TELESCOPIC SIGHT

Ralph A. Litschert, Winchester, Ind.

Application September 1, 1943, Serial No. 500,828

3 Claims. (Cl. 33—50)

My invention relates to improvements in telescopic sights for rifles, more particularly, the primary object in view being to equip such devices for quick, accurate and easy elevation adjustments internally of the telescope tube, and by means of simply constructed, quick acting devices inexpensive to manufacture and which will not appreciably increase the production cost of such sights.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in side elevation of a telescopic sight equipped according to my invention in its preferred embodiment, Figure 2 is a fragmentary view in longitudinal section drawn to an enlarged scale, Figure 3 is a view in transverse section taken on the line 3—3 of Figure 2, Figure 4 is a view in perspective of the reticule cylinder and leaf spring forming extension.

Referring to the drawing by numerals, my improvements have been shown therein as embodied in a telescope sight comprising as its basic element the usual telescope tube 1 for the usual objective and inverter lenses, not shown, and having a threaded end section 2 from which the usual ocular lens holder 3 extends for threaded adjustment thereon and clamping into adjusted position by a knurled lock nut 4.

According to my invention, a reticule cylinder 5 having the usual sighting cross wires 6 in one end thereof is mounted in the telescope 2 in advance of the lens holder 3 for vertical swinging adjustment by means of a tongue-like edge extension 6 at one end and top thereof forming a leaf spring extending forwardly in the telescope 2 along the top of the same and having its free end attached by screws, as at 7, to said tube. As will be understood, the leaf spring forming extension 6 tends to urge the reticule cylinder 5 upwardly and provides for yielding adjustment of the same downwardly.

For adjusting the reticule cylinder 5 downwardly, an internally threaded adjusting sleeve 8 is provided on the threaded end section 2 of the telescope tube 1 with its rear end surrounding the reticule cylinder 5 and tapered internally to flare rearwardly, as at 9. The flaring end 9 forms a cam adapted under turning of the adjusting sleeve 8 rearwardly to depress a ball member 10 disposed in a circular aperture 11 in the top of the telescope tube 1, said ball member being seated in a socket-forming indentation 12 provided in the top of said cylinder 5. The rear end of the adjusting sleeve 8 is externally knurled, as at 13, and forms a hand grip for turning said sleeve. An internally threaded locking sleeve 14 is provided on said end section 2 for turning against the rear end of the adjusting sleeve 8 to lock the latter in adjusted position. The front end of the adjusting sleeve 8 is beveled and graduated circumferentially, as at 15, and the telescope tube 1 is provided with a longitudinal line of graduations 16 thereon, whereby micrometer adjustments of the adjusting sleeve 8 forwardly and rearwardly on the telescope tube 1 may be effected.

The operation of my invention will be readily understood. Under adjustment of the adjusting sleeve 8 rearwardly, the flaring end 9 thereof cams the ball member 10 downwardly inwardly of the telescope tube 1, and lowers the reticule cylinder 5 in opposition to the tension of the spring-forming extension 6 to correspondingly lower the sight. Conversely, adjustment of said adjusting sleeve 8 forwardly permits the extension 6 to elevate said cylinder 5 and sight.

As will be appreciated, the invention involves few parts easily operated and which will not readily get out of order, and whereby the sight may be accurately and finely adjusted for elevation within a wide range of variations and within the telescope tube 1.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a telescopic gun sight including a telescope tube and a reticule cylinder in said tube, means to mount said cylinder in the tube for adjustment crosswise of the tube, means to adjust said cylinder comprising an adjusting sleeve on said tube movable along the same into different set positions, and means to lock the adjusting sleeve in different set positions comprising a locking sleeve on said tube adjustable on the tube into locking engagement with said sleeve.

2. In a telescopic gun sight including a telescope tube and a reticule cylinder in said tube, means to mount said cylinder in the tube for adjustment crosswise of the tube, means to adjust said cylinder comprising an adjusting sleeve on said tube movable longitudinally along the same into different set positions and having a cam forming internally flaring end, and a member intermediate said flaring end and said cylinder adapted to be cammed by said flaring end transversely of said tube to move said cylinder in proportion of movement of said sleeve longitudinally of said tube.

3. In a telescopic gun sight including a telescope tube and a reticule cylinder in said tube, means to mount said cylinder in the tube for adjustment crosswise of the tube, means to adjust said cylinder comprising an adjusting sleeve on said tube movable longitudinally along the same into different set positions and having an internally flaring end forming a cam surface, and a member intermediate said flaring end and said cylinder adapted to be cammed transversely of said tube by movement of said flaring end along said tube, and comprising a ball seated on said cylinder.

RALPH A. LITSCHERT.